2,923,704
CYCLOAMYLOSE SULFATES AND DERIVATIVES THEREOF

Leo Berger, Montclair, and John Lee, Essex Fells, N.J., assignors to Hoffmann-La Roche Inc., Nutley, N.J., a corporation of New Jersey No Drawing. Application May 15, 1957
Serial No. 659,226

7 Claims. (Cl. 260—209)

This invention relates to cycloamylose sulfates and derivatives thereof. More particularly, the invention relates to cyclohexaamylose sulfate, cycloheptaamylose sulfate and salts thereof.

The compounds of this invention are produced by sulfating cyclohexaamylose or cycloheptaamylose, for example, with chlorosulfonic acid and pyridine. Cyclohexaamylose sulfate and cycloheptaamylose sulfate may be converted into salts, e.g. alkali metal salts or alkaline earth metal salts such as the sodium, potassium, lithium, calcium or barium salts, by treating the sulfate with an alkali metal or alkaline earth metal compound such as sodium acetate, calcium acetate, potassium acetate, lithium acetate, etc. Cyclohexaamylose sulfate and cycloheptaamylose sulfate also form salts with ammonium and substituted ammonias, e.g. ammonium, diethanolamine, ethylenediamine and glucamine salts, etc. The alkali metal salts of the sulfated cycloamylose are soluble in water and they may be purified by precipitation from aqueous solutions with a miscible solvent of the class of alcohol or ketones as for example ethanol or acetone.

The compounds of this invention are useful for the clearing of the lipemic plasma and may be utilized in the treatment of coronary diseases in which there are hyperlipemia or hypercholesterolemia associated with arteriosclerosis. The compounds may be administered orally or parenterally by incorporating therapeutic dosages, preferably of the pharmaceutically acceptable salts, in conventional vehicles and/or excipients according to accepted pharmaceutical practice.

The following examples are illustrative of the invention. All temperatures are in degrees centigrade.

Example 1

74 ml. of chlorosulfonic acid were carefully added to 430 ml. of dry pyridine at 0°–5° with constant stirring. The mixture was then heated to 70°–75°. While stirring constantly, 20.0 g. of crystalline cyclohexaamylose (ground to a fine powder) were added rapidly. The reaction mixture was stirred at 80°–85° for 6 hours and then poured into 8 liters of methanol with stirring. The crude pyridine salt of cyclohexaamylose sulfate separated and was collected by filtration on a sintered glass funnel, washed with small quantities of methanol and then air dried. The pyridine salt was then converted to the sodium salt by dissolving it in 250 ml. of water and adding 50 ml. of 30% aqueous sodium acetate solution. The crude sodium salt of cyclohexaamylose sulfate was precipitated by the addition of this solution, with constant stirring, to 1200 cc. of ethanol. The precipitated crude sodium salt was collected on a sintered funnel, washed with ethanol and air dried. The sodium salt of cyclohexaamylose sulfate was further purified by dissolving the crude salt in 400 ml. of water, adding 40 ml. of 30% aqueous sodium acetate solution, filtering the aqueous solution through an asbestos pad and reprecipitating the sodium salt by adding the aqueous solution to 4 liters of ethanol. The pure sodium salt of cyclohexaamylose sulfate separated as a fine amorphous powder. The product was collected on a sintered glass funnel, washed with ethanol and dried in vacuo over anhydrous calcium chloride. The sodium salt of cyclohexaamylose sulfate has the following characteristics: $[\alpha]_D^{25} = +69.9° \pm 2°$ (1.72% solution in 0.5 N NaCl).

*Analysis.*—Calculated for $$[C_6H_7O_{14}S_3Na_3]_6 \cdot 5C_2H_5OH \cdot 7H_2O$$

C=17.42; H=2.71; S=18.18; Na=13.08. Found: C=17.53, 17.57; H=2.82, 2.94; S=17.75, 17.61; Na=13.46, 13.55.

Example 2

43 ml. of chlorosulfonic acid were carefully added to 260 ml. of dry pyridine at 0°–5° with constant stirring. The mixture was then heated to 70°–75°. 11.6 g. of crystalline cycloheptaamylose (ground to a fine powder) were added rapidly with constant stirring. The reaction mixture was stirred at 80°–85° for 6 hours and then poured into 6 liters of methanol with constant stirring. The crude pyridine salt of cycloheptaamylose sulfate precipitated and was separated by filtration through a sintered glass funnel under suction. The pyridine salt which collected on the funnel was washed several times with methanol, air dried and redissolved in 76 ml. of water. 50 ml. of a 30% sodium acetate solution were added to the aqueous solution to convert the pyridine salt to the sodium salt. The aqueous solution was added to 1 liter of ethanol with stirring to precipitate the sodium salt of cycloheptaamylose sulfate. Most of the supernatant liquid was siphoned off from the precipitated salt and the crude sodium salt was then collected by filtration on a sintered glass funnel. The salt was washed with small portions of ethanol and then air dried. The sodium salt of cycloheptaamylose sulfate thus obtained was then dissolved in 250 ml. of water, 25 ml. of 30% sodium acetate were added and the solution was filtered through an asbestos filter pad.

The clear filtrate was added to 1200 ml. of ethanol and the pure sodium salt of cycloheptaamylose sulfate precipitated. The precipitated product was collected by filtration on a sintered glass funnel, washed with ethanol and then air dried. The sodium salt of cycloheptaamylose sulfate is a white amorphous powder with the following characteristics: $[\alpha]_D^{25} = +68.6° \pm 2°$ (1.87% solution in 0.5 N NaCl).

*Analysis.*—Calculated for $$[C_6H_7O_{14}S_3Na_3]_7 \cdot 5C_2H_5OH \cdot 10H_2O$$

C=16.92; H=2.68; S=18.22; Na=13.10. Found: C=17.17, 17.04; H=2.55, 2.38; S=17.88, 1803; Na=13.47, 13.33.

We claim:
1. A compound of the group consisting of cyclohexaamylose sulfate, cycloheptaamylose sulfate and salts thereof.
2. Cyclohexaamylose sulfate.
3. Alkali metal salts of cyclohexaamylose sulfate.
4. Sodium salt of cyclohexaamylose sulfate.
5. Cycloheptaamylose sulfate.
6. Alkali metal salts of cycloheptaamylose sulfate.
7. Sodium salt of cycloheptaamylose sulfate.

References Cited in the file of this patent
UNITED STATES PATENTS

| | | |
|---|---|---|
| 2,033,787 | Rigby | Mar. 10, 1936 |
| 2,686,779 | Jones | Aug. 17, 1954 |
| 2,689,848 | Husemann et al. | Sept. 21, 1954 |
| 2,697,093 | Jones | Dec. 14, 1954 |

OTHER REFERENCES

J. Amer. Chem. Soc., vol. 64, pp. 1651–3 (1942).